United States Patent
Vakil et al.

(10) Patent No.: US 7,050,507 B2
(45) Date of Patent: May 23, 2006

(54) ADAPTIVE THROUGHPUT PULSE WIDTH MODULATION COMMUNICATION SCHEME

(75) Inventors: Kersi H. Vakil, Olympia, WA (US); Jerry G. Jex, Olympia, WA (US); Arnaud J. Forestier, Federal Way, WA (US); Abhimanyu Kolla, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 707 days.

(21) Appl. No.: 10/128,615

(22) Filed: Apr. 22, 2002

(65) Prior Publication Data
US 2003/0200364 A1    Oct. 23, 2003

(51) Int. Cl.
*H04L 27/00* (2006.01)
*H04L 27/04* (2006.01)
*H04L 27/06* (2006.01)

(52) U.S. Cl. .................. 375/259; 375/295; 375/316
(58) Field of Classification Search ............... 375/222, 375/238, 239, 257, 295, 225, 259, 316; 327/291, 327/294, 298, 299; 348/465, 468
See application file for complete search history.

(56) References Cited

U.S. PATENT DOCUMENTS

| 4,764,769 A * | 8/1988 | Hayworth et al. ............. 342/50 |
| 6,429,703 B1 * | 8/2002 | Chang ......................... 327/112 |
| 6,690,309 B1 * | 2/2004 | James et al. ................ 341/102 |
| 6,744,398 B1 * | 6/2004 | Pyner et al. ................. 342/125 |
| 6,898,724 B1 * | 5/2005 | Chang ......................... 713/500 |
| 2001/0046163 A1 * | 11/2001 | Yanagawa ..................... 365/194 |
| 2002/0079917 A1 * | 6/2002 | Ohtaki et al. ................ 324/765 |

* cited by examiner

*Primary Examiner*—Tesfaldet Bocure
*Assistant Examiner*—Naheed Ejaz
(74) *Attorney, Agent, or Firm*—Schwegman, Lundberg, Woessner & Kluth, P.A.

(57) ABSTRACT

A signaling apparatus and system may include a data transmitter capable of sending strobe and one or more data streams having edges displaced by time periods corresponding to coded values. Auto-negotiation to compensate for less expensive interconnections may be accomplished using various embodiments of the invention. The data transmitter may be coupled to a medium and a data receiver. An article, including a machine-accessible medium, may contain data capable of causing a machine to carry out a communication method, including transmitting strobe and data streams having edges displaced by time periods corresponding to coded values. A coded information signal may comprise one or more edges displaced in time from various strobe signal edges, the displacement corresponding to coded values.

23 Claims, 9 Drawing Sheets

ADAPTIVE THROUGHPUT PULSE WIDTH MODULATION COMMUNICATION SCHEME

TECHNICAL FIELD

Embodiments of the present invention relate generally to apparatus and methods used for sending and receiving information in electronic communication systems. More particularly, embodiments of the present invention relate to information transfer using strobed data.

BACKGROUND INFORMATION

With improvements in processor and software performance, and a nearly continuous reduction in the price of bulk storage, the demand for higher data communication rates continues to grow. Simplified methods and hardware for reliably transmitting and receiving large amounts of data are also valued. This becomes especially apparent with the appearance of low-cost data transmission applications, such as toy video cameras and microscopes, where high framerates are more important than completely accurate color reproduction.

Some solutions which have evolved include increased interconnect clocking speeds, special hardware (e.g., fiber optics and/or analog signal processing circuitry), and wide buses. Of course, each of these has its drawbacks, including the cost of implementation and the complexity of execution.

Another solution involves source synchronous data transmission combined with data pumping. The basic premise of source synchronous signaling schemes involves sending data signals along with a synchronous strobe. During each strobe cycle the strobe and the data are captured so that the incoming data can be decoded as either a binary "1" or a "0", using the strobe as a reference. Source synchronous buses have been used in the industry for some time.

Data pumping allows data to be transmitted at some rate higher than the base clock frequency. However, the raw throughput-per-pin can never exceed the strobe signal frequency. Further, taking advantage of such technology often requires sophisticated, expensive hardware. Increasing performance may require a complete change of transmitting and receiving equipment, along with signal connections, so that the desired interconnect bandwidth can be achieved.

Thus, prior methods of increasing data communication speeds are either costly, complex, or limited to the frequency of the strobe clock. Therefore, there is a need in the art to enhance signaling bandwidth without stressing the frequency response of the interconnect. This need should be satisfied by using simple logic circuitry, which can be easily synthesized and validated. Any required analog front-end circuitry should have straightforward performance requirements, and a minimal number of conductors should be required for sending large amounts of data. Finally, improved methods of speed negotiation should adapt to increased transmission speeds as conditions permit—without user intervention.

DETAILED DESCRIPTION OF THE EMBODIMENTS OF THE INVENTION

Figure 1:
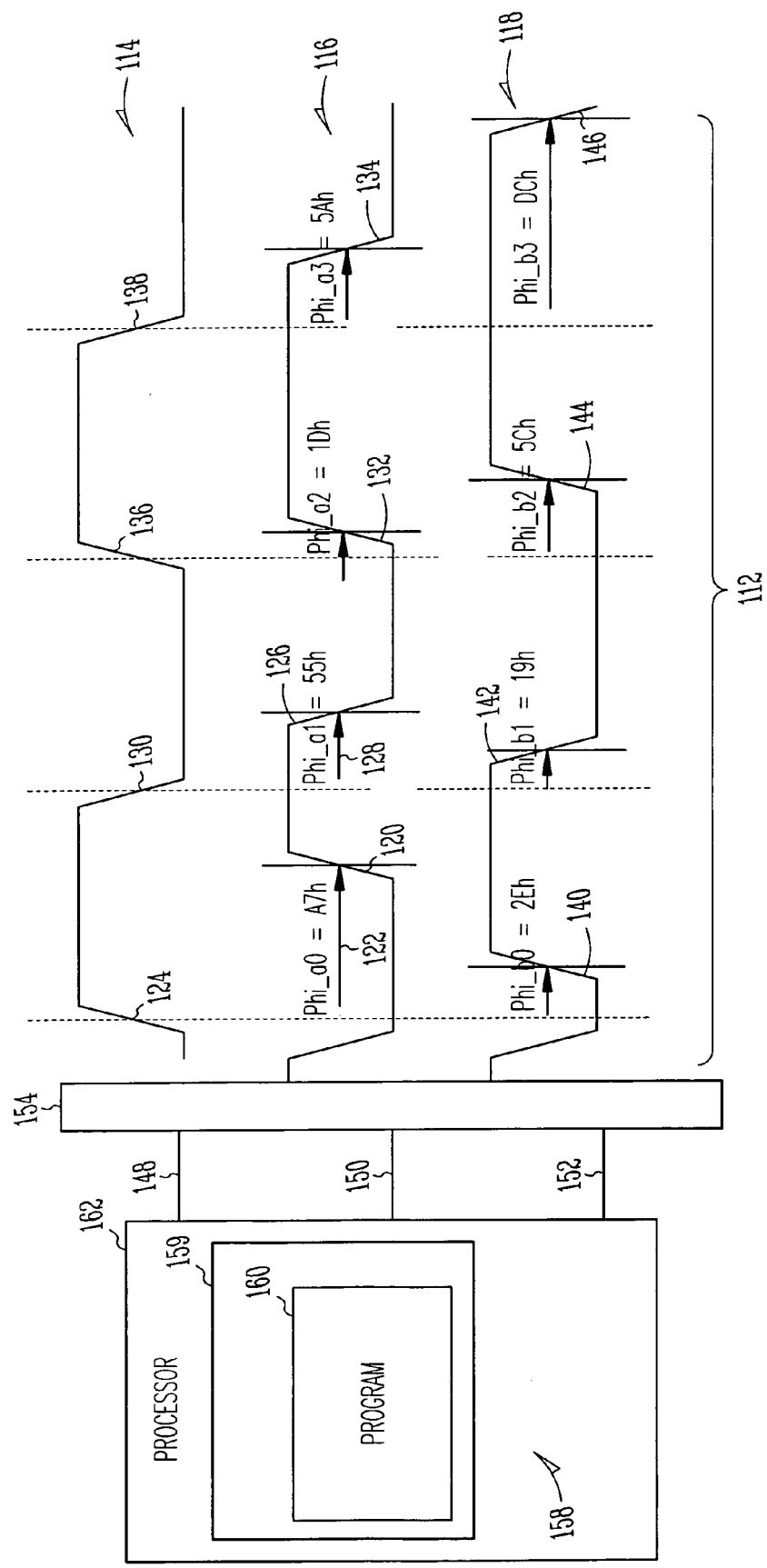
FIG. 1 is a block diagram of an article and a carrier wave according to various embodiments of the present invention.

In the following detailed description of embodiments of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to understand and implement them. Other embodiments may be utilized and derived therefrom, such that structural and logical substitutions and changes may be made without departing from the scope of the present disclosure. The following detailed description, therefore, is not to be taken in a limiting sense, and the scope of various embodiments of the invention is defined only by the appended claims, along with the full range of equivalents to which such claims are entitled.

FIG. 1 is a block diagram of an article and a carrier wave according to various embodiments of the present invention, the operation of which can be most easily understood by considering a coded information signal embodied in a set of carrier waves 112, which may include a strobe signal 114, a data stream signal 116, and possibly one or more other data stream signals 118. In this example, each data stream signal 116, 118 is double pumped and sent in a source synchronous fashion (e.g., using pulse width modulation) with respect to the strobe signal 114. The detected data is shown in Hex (base$_{16}$) notation, and the time/phase difference between the strobe 114 and data signals 116, 118 is interpreted as an n-bit coded word. In this example, n=8, representing 256 discrete phase quantization levels. However, n may be any number from 2 on up to a number limited only by the hardware and medium used to propagate and carry the set of carrier waves 112, as will be discussed later. The code word data values are determined by noting that one of the signal edges is displaced by a time period from a rising edge of the strobe signal, which may correspond to a first coded value, while another of the signal edges is displaced by a second time period from a falling edge of the strobe signal, which may correspond to a second coded value.

Thus, for example, the data stream signal 116 carries the Hex value A7h (e.g., the first coded value) by using the rising edge 120 displaced by a time period 122 from the rising edge 124 of the strobe signal 114. The data stream signal 116 also carries the Hex value 55h (e.g., the second coded value) by using the falling edge 126 displaced by a time period 128 from the falling edge 130 of the strobe signal 114. similarly, the Hex values 1Dh and 5Ah can be detected and decoded by determining where the rising and falling edges 132, 134, respectively, of the data stream signal 116 occur with respect to the rising and falling edges 136, 138 of the strobe signal 114. Likewise, it can be seen that the data stream signal 118 has been encoded to carry the Hex values 2Eh, 19h, 5Ch and DCh at the first rising and falling edges 140, 142 and the second rising and falling edges 144, 146, respectively, in relation to the strobe signal 114 rising and falling edges 124, 130, 136, 138, respectively.

Figure 2:
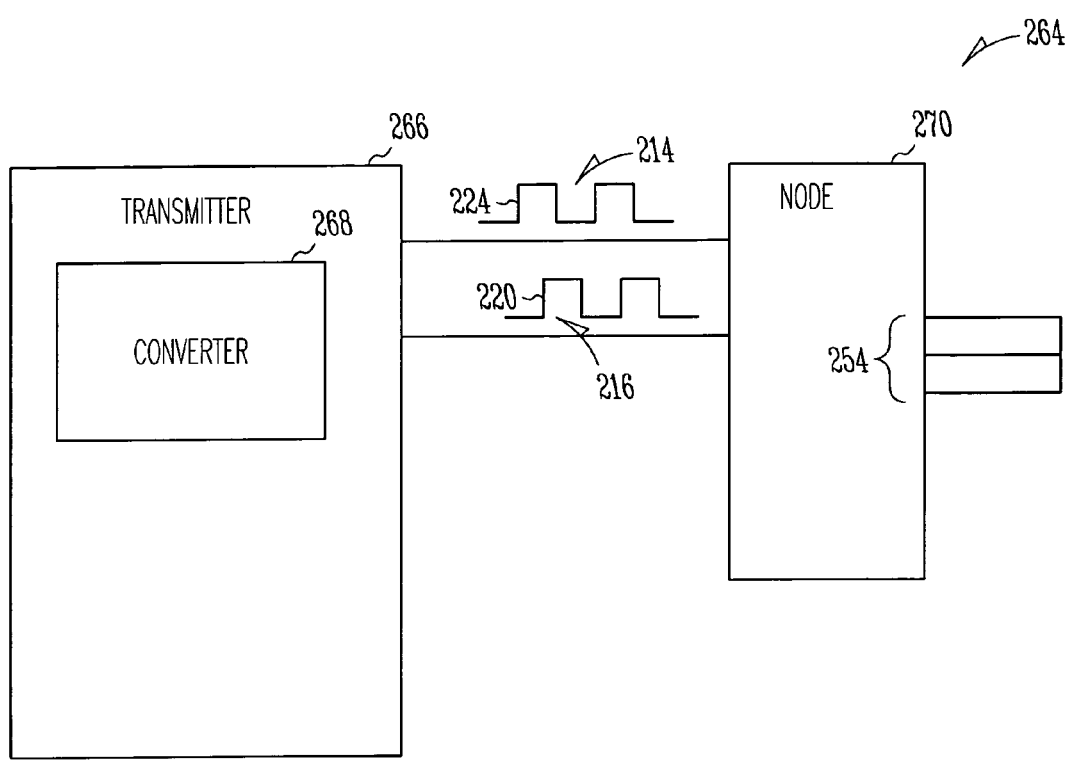
FIG. 2 is a block diagram of an apparatus according to an embodiment of the invention.

In this manner, a single conductor may be used to convey a multi-bit (i.e., n-bit) data stream. For example, a first conductor 148 may be used to convey the strobe signal 114, a second conductor 150 may be used to convey the data stream 116, and a third conductor 152 may be used to convey the second data stream 118. Of course, while the exemplary embodiments herein do not illustrate the use of more than two data streams, 116 and 118, it will be realized by those of ordinary skill in the art that the scope of other embodiments may be extended to any arbitrary number of data streams, given a sufficient number of conductors. As will be discussed later, the data conveyed using various embodiments of the invention may be placed into a conducting medium 154, such as a cable, using an article 158, including a medium, such as memory 159, containing program instructions 160 executed by a machine, such as a processor 162. However, various other apparatus according to various embodiments of the invention can also be used to insert data into conducting media. For example FIG. 2 is a block diagram of such an apparatus according to an embodiment of the invention. In this case, the apparatus 264 may comprise a data transmitter 266 to send the strobe signal 214 having a strobe edge 224, and a data stream 216 having a first data edge 220 displaced by a time period (corresponding to the desired coded value) from the strobe edge 224. The data transmitter 266, in turn, may include a converter module 268 used to translate the coded values into corresponding time periods, which are selected from a predetermined number of $2^n$ time periods representing $2^n$ n-bit coded values, similar to or identical to the correspondence shown in FIG. 1. The converter module 268 may also reside outside of the data transmitter 266. The apparatus 264 may also include a signaling node 270 capable of being communicatively coupled to the data transmitter 266, and a medium 254 to carry the strobe signal 214 and the data stream 216. It should be noted that the signaling node 270 may include one or more conductors, such as wires, circuit traces, a fiber optic transmitter, or any other circuit, device, or element, such as a hardwired electrical connector, which can be used to couple the data transmitter 266 to the medium 254.

Figure 3:
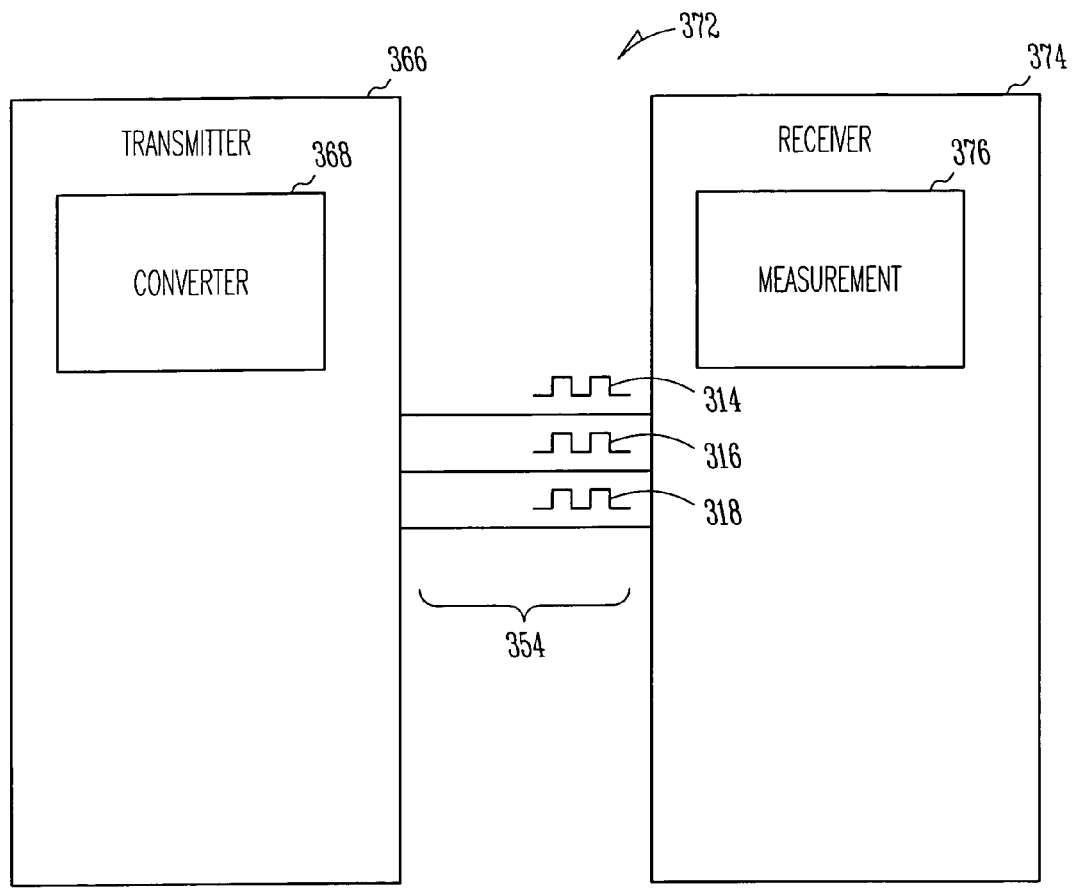
FIG. 3 is a block diagram of a system according to an embodiment of the present invention.

FIG. 3 is a block diagram of a system according to an embodiment of the present invention. In this case, the system 372 may include a data transmitter 366 to send a strobe signal 314 and a data stream 316, including the rising and falling edges, which determine time displacements and corresponding coded values, as described previously. The system 372 may also include a data receiver 374 capable of being communicatively coupled to the data transmitter 366, possibly using a medium 354 to carry the strobe and data streams 316, 318 as well as other data streams. As will be realized by those skilled in the art, any number of data streams 316, 318 containing data may be communicated using the system 372. As the data transmitter 366 may include a converter module 368, so too the data receiver 374 may includes a measurement module 376 to measure the time periods between the strobe signal edges and the data signal edges, and convert the determined time periods into corresponding n-bit coded values.

Figure 4:
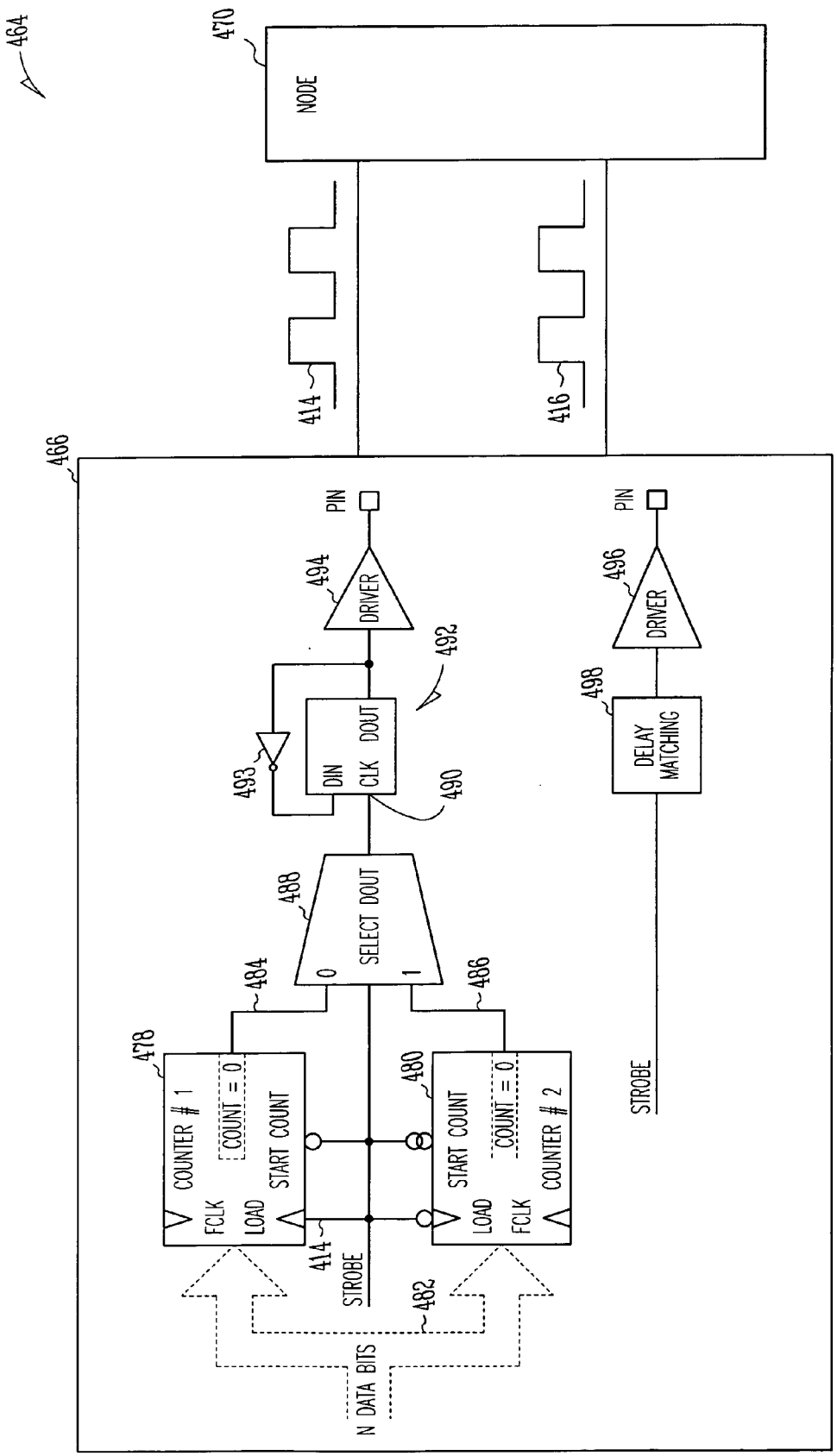
FIG. 4 is a schematic diagram of an apparatus according to an alternative embodiment of the invention.

FIG. 4 is a schematic diagram of an apparatus according to an alternative embodiment of the invention. In this case the apparatus 464 may include a data transmitter 466 coupled to a node 470. The transmitter 466 may include various logic modules, such as a pair of n-bit "count-to-zero" down counters 478, 480.

During operation, an n-bit code value to be transmitted may be loaded as an initial value for the first counter 478. When given a "start" signal, such as the rising edge of a strobe signal, the counter 478 may count down until a count=0 is reached. At this point the counter 478 stops counting, and the output "counter=0" may be set to a logic "1" or high value. The counter 478 is typically designed that once the count=0 value is reached, the counter 478 will halt, and refrain from beginning to count again. That is, the counter 478 is typically guaranteed by design never to underflow.

Thus, in this case, the first counter 478 may load a first n-bit code value from a data bus 482, for example, on the rising edge of the strobe signal 414 and begin counting down during the low phase of the strobe signal 414. The second counter 480 may load data from the bus 482 on the falling edge of the strobe signal 414 and begin counting down during the high phase of the strobe signal 414. Hence it can be seen that the counters 478, 480 work alternately—whilst one is loading the count (corresponding to the desired n-bit code value), the other counts down to zero. Thus it is understood that the data transmitter 466 may include first and second non-underflow, count-to-zero down-counters 478, 480 to load first and second coded values, respectively.

Both of the counters 478, 480 may generate an active-high signal or "1" to indicate when a count of zero is reached. This signal may be asynchronously produced by taking an n-bit NOR of the current count. For example, assuming the output signals are "Count1=0" 484 and "Count2 =0" 486 for the two counters 478, 480, respectively. These signals 484, 486 may be used as the inputs to a 2:1 multiplexer 488 controlled by the strobe signal 414. In this manner, the appropriate signal 484, 486 is passed to the clock input 490 of a D-type flip-flop 492 that has been configured to toggle on the rising edge of the flip-flop clock input 490, using an inverter 493 placed between the input and the output. The change in the output of the flip-flop 492 is seen at the input of the data driver 494. Propagation time through the driver 494 can be ignored if care is taken in designing the strobe and data drivers 496, 494 to have equal rise and fall times, and equal propagation delays as well. Otherwise, a delay matching network 498 may be required to ensure that the edges of the strobe and data signals are separated by the appropriate time periods. The delay matching network may also be used to compensate for the delay through the multiplexer 488 and the flip-flop 492. Thus it can be inferred that the data signal may toggle after the strobe, the time period between the strobe toggling and the data stream toggling being a function of the n-bit code loaded into a counter, such as the counters 478, 480.

Figure 5:
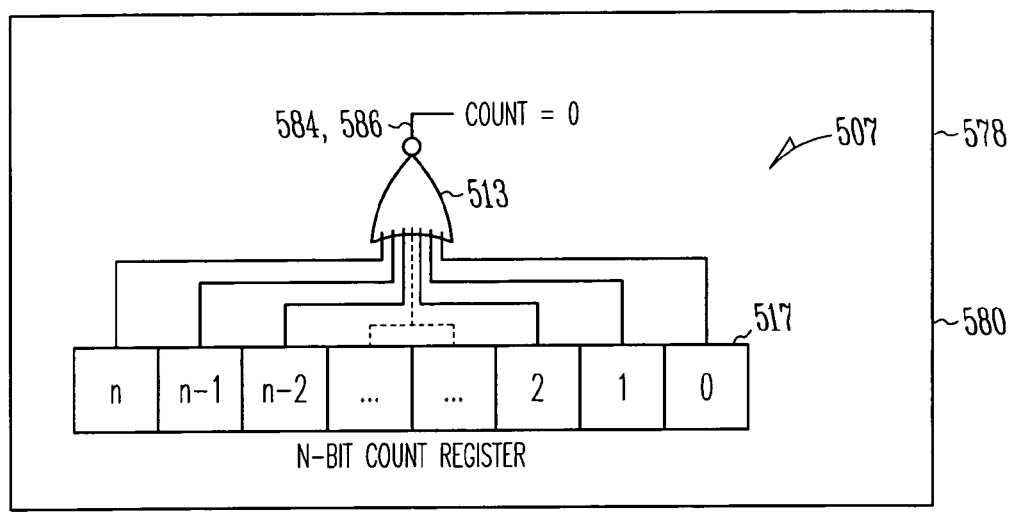
FIG. 5 is a schematic diagram of an asynchronous zero-count detector according to an embodiment of the invention.

FIG. 5 is a schematic diagram of an asynchronous zero-count detector according to an embodiment of the invention. The exemplary zero-count detector 507, which may be included in either or both of the counters 578, 580, may include an n-bit NOR gate 513. As noted above, the output signals 584, 586 (equivalent to or identical to the output signals 484, 486 for the two counters 478, 480, respectively) may be asynchronously produced by taking an n-bit NOR input 517 of the current count. The output signals 584, 586 may in turn be used as the inputs to a multiplexer (e.g., see multiplexer 488 in FIG. 4). As is the case with most low-power, high-speed signaling designs, complementary metal-oxide semiconductor (CMOS) drivers with impedance compensation may be required in order to minimize signal reflections and improve signal integrity. Slew rate compensation for rising and falling edges may be used to more closely match rise and fall times of the chosen interconnect mechanism.

Figure 6:
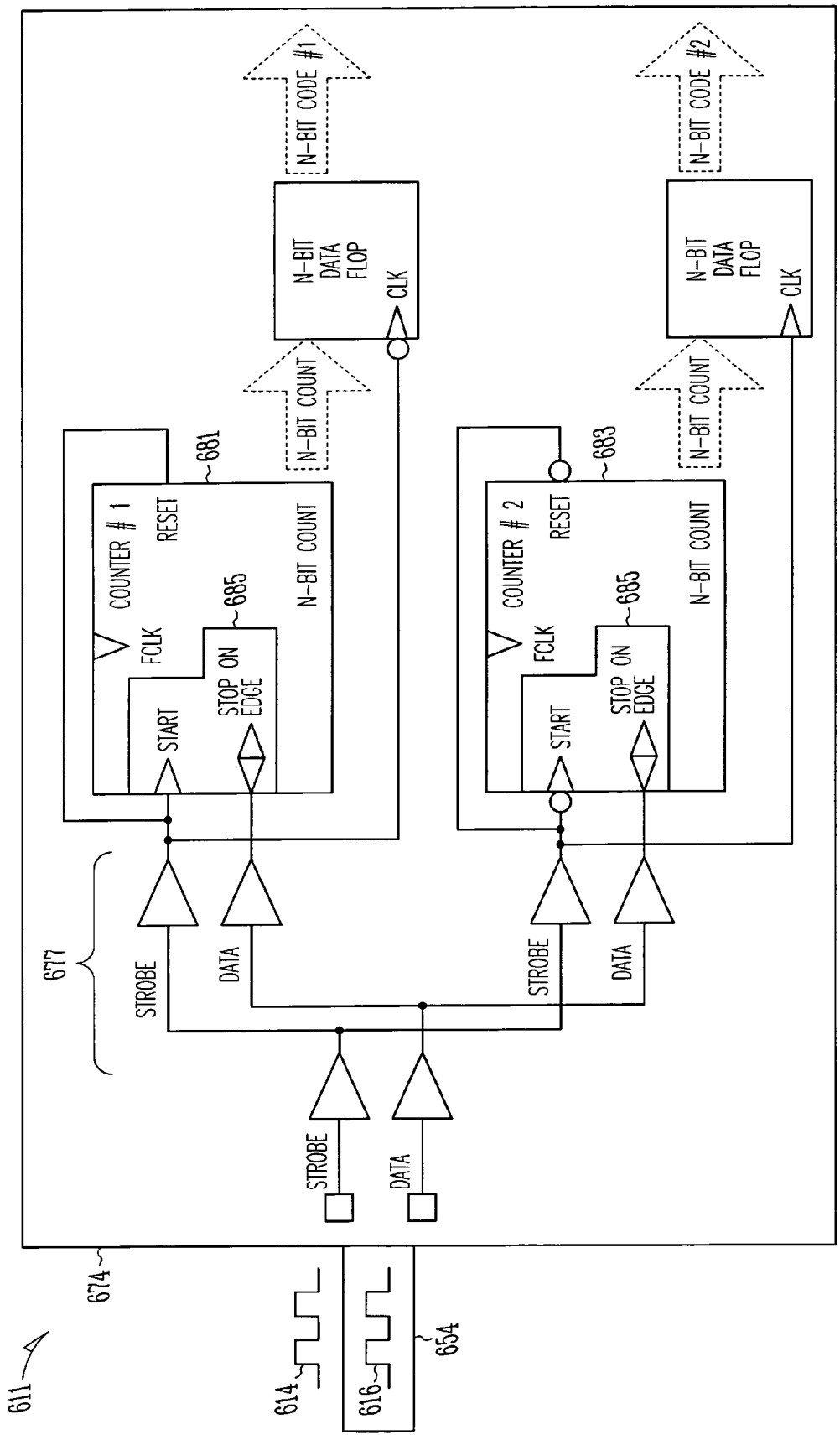
FIG. 6 is a schematic diagram of an apparatus according to an alternative embodiment of the invention.

FIG. 6 is a schematic diagram of an apparatus according to an alternative embodiment of the invention. In this case the apparatus 611 may include a data receiver 674 capable of being coupled to a medium 654 which carries a strobe signal 614 and one or more data signals 616. The data receiver 674 may include an analog front-end 677 which buffers the strobe and data signals 614, 616. Care should be taken, possibly using the same buffer design, to ensure equal rise and fall time delays for the strobe and data signals 614, 616. A matched current design employing complementary P-N structures and having sufficiently flat bandwidth may also help to provide equal response to incoming signals.

The data receiver 674 may include two n-bit "count-from-zero" up counters 681, 683. In this case, the first counter 681 may begin counting during the high phase of the strobe signal 614, and stop counting when an edge (e.g., a rising edge) is detected on the data signal 616. Thus, each counter 681, 683 may be coupled to, or include, an edge detector 685. In this case, the first counter 681 may be designed to pass on the final count on the falling edge of the strobe signal 614. The falling edge of the strobe signal 614 may also cause the first counter 681 to reset.

The second counter 683 typically operates in a complementary fashion. Thus, when the first counter 681 is counting up, the second counter 683 may be sending the completed count to the core. Since reading the count and the subsequent reset for each counter 681, 683 occur almost at the same time, some mechanism should be provided so that each counter 681, 683 is not reset until after the completed count has been read out. This may be accomplished using a delay element (not shown) for the strobe signal 614 to compensate for any delay through the edge detector 685.

Thus, the data receiver 674 may include a first count-up counter 681 that starts counting from a value of approximately zero when the strobe edge (e.g. the rising edge of the strobe signal 614) is detected, and stops counting at approximately the decoded value when the corresponding data edge is detected (e.g., the corresponding rising edge in the data stream 616). The word "approximately" is used here to indicate that other count values may be used (e.g., the counter 681 may begin counting at a value of "1", and end counting at a value of "coded value+1"), so long as the counted value can be equated to the desired coded value in some fashion. Similarly, the data receiver 674 may include a second count-up counter 683 that starts counting from a value of approximately zero when a falling edge of the strobe signal 614 is detected, and stops counting at approximately a second decoded value when a corresponding edge of the data stream 616 is detected. It should be noted that while corresponding rising data and strobe edges, and corresponding falling data edges and strobe edges have been used for illustration purposes herein, such correspondence is not necessary in all embodiments of the invention. Such illustrations have been used to simplify the operational explanation of various embodiments, and it will be realized by those of ordinary skill in the art that it is also possible to have a falling data edge following a rising strobe edge, for example, or a rising data edge following a falling strobe edge.

Figure 7:
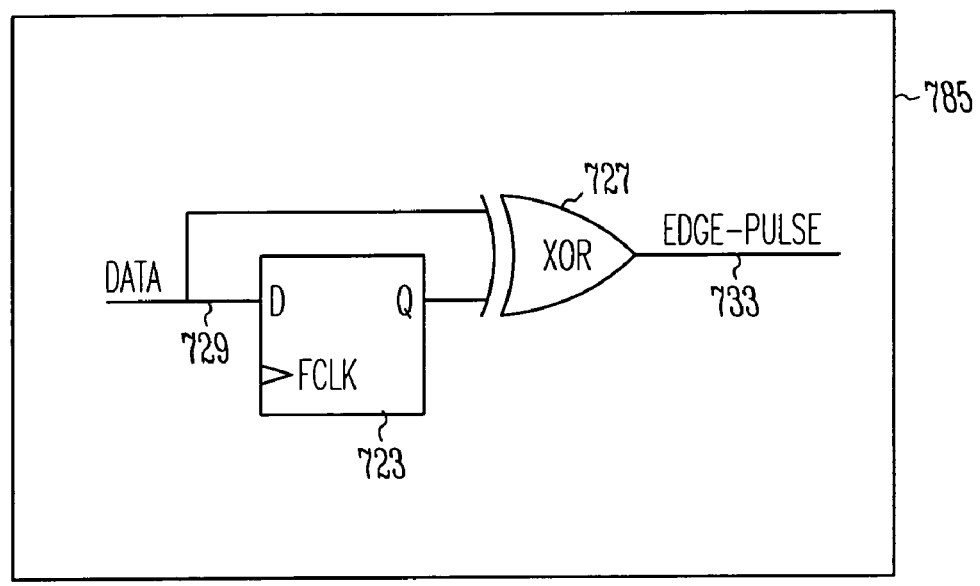
FIG. 7 is a schematic diagram of an edge detector according to an embodiment of the invention.

FIG. 7 is a schematic diagram of an edge detector according to an embodiment of the invention. The exemplary edge detector 785 may be included in either one or both of the counters 681, 683, and may comprise a D flip-flop 723 coupled to an exclusive OR gate 727. In use, the edge detector 785 may be used in multiple instances to detect the rising or falling edges of the strobe signal and/or or data streams, as desired by the architect of various embodiments of the invention. The apparatus and methods disclosed herein can be used in many applications. For example, consider a parallel bus which serves as an interconnect between two components. The system architect may choose to implement a communication scheme wherein n=8 to implement an 8-bit bus running @ 33 MHz. Such a system should provide roughly the same throughput as a single-pumped 64-bit bus running at 66 MHz. However, instead of 64 conductors, only eight wires are used, operating at half the frequency (since the data is double-pumped). Comparable throughput may be achieved, along with a reduction in routing congestion.

Up to this point, it has been assumed that the value of each decoded n-bit code word is directly proportional to the phase or time difference between a leading strobe edge and a corresponding following data edge. However, under some conditions, due to hardware and/or medium/interconnect limitations, the scheme may fail. For example, assume a coding scheme with n=8. Possible decoded values thus range from 00h to FFh. Problems may occur when a value of FFh (and other high value code words) are sent, followed immediately by low value code words, such as 00h. Such communication activity results in a very narrow pulse that may stress the interconnect between the data transmitter and receiver, as well as the sensitivity requirements of the receiver. Factors such as medium loss and deterministic jitter may overwhelm the lone pulse - causing gross errors. As a result of this phenomenon, it may be necessary to implement auto-negotiating logic, resulting in the insertion of "skip" characters.

Figure 8:
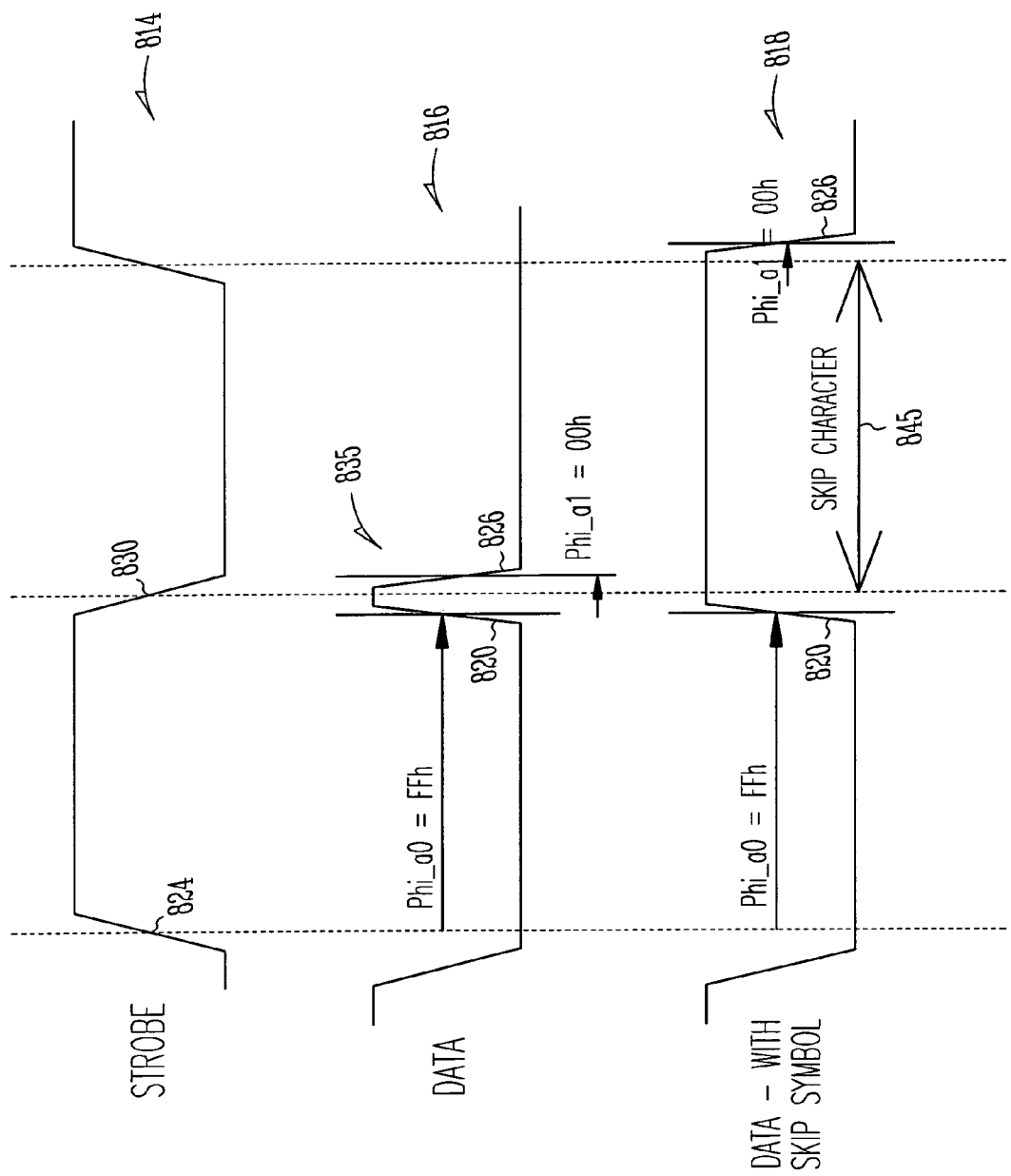
FIG. 8 is a waveform diagram demonstrating the introduction of a skip character into a data stream according to an alternative embodiment of the invention.

FIG. 8 is a waveform diagram demonstrating the inclusion of a skip character into a data stream according to an alternative embodiment of the invention. Here the strobe signal 814 and the data stream 816 are shown using the example of first sending a code word value of FFh, indicated by the rising edge 820 in the data stream 816 (after the occurrence of the rising edge 824 in the strobe signal 814), immediately followed by a code word value of 00h, indicated by the falling edge 826 in the data stream 816 (after the occurrence of the falling edge 830 in the strobe signal 814). The resulting lone pulse 835 may be too short, and contain too high a frequency content, to propagate from the transmitter to the receiver with corrupting the encoded data.

To determine when this type of problem may arise, a simple algorithm may be used. For example, at link initialization, the transmitter may send out a series of increasingly stressful lone pulses, starting with (for example) 00h-AFh-00h . . . 00h-B0h-00h . . . 00h-B1h-00h . . . 00h-B2h-00h . . . 00h-DFh-00h . . . 00h-EFh-00h . . . 00h-F3h-00h . . . 00h-FFh-00h. Each training sequence should be acknowledged by the receiving agent. Depending on the quality and/or length of the interconnect, as well as the sensitivity of the receiver, a failure point may be determined to occur at some interval along the training sequence. Once the failure point is determined, it will then be known that similar "long jump" sequences may also fail. For example, if the sequence 00h-EFh-00h resulted in a failed transmission, then the set of long jumps (EF/F0/F1. . . FF)h-00h also will likely fail, since each would be progressively more stressful than the one preceeding it. Of course, no failure point may be determined, in which case the auto-negotiating logic is not needed.

In any case, at least two auto-negotiating schemes may be proposed. First, assuming a determined failure point of EFh-00h, for example, (for example), then it may be specified that only EFh valid code words exist, so that only code words in the range of 00h to EEh will be recognized (e.g., one code word before the failing point). The specified valid range would then be communicated to the receiving agent (e.g., the data receiver), and the coding scheme would now result in communicating $2^m$ bits, where m<n, and m is not necessarily an integer value. The range of usable codes may be increased by using a better quality interconnect (e.g., co-axial cables, low-loss connectors, shielded conducting media).

Second, also assuming a determined failure point of EFh, the transmitting agent (e.g., data transmitter) may record this value as the limit for long jumps within the communication system topology. Additionally, using the determined failure point, the transmitting agent may have a two code word memory used to qualify each data sequence as a viable long jump, or not. Each time a non-viable long jump is requested, the transmitting agent may then insert a "skip" character 845 into the data sequence, resulting in a modified data stream 818. The skip character is essentially a time interval where no transition occurs on the data line. At the data receiver, the count-from-zero up counter will overflow during reception of a skip character 845. Thus, provision should be made so that some indication of an overflow occurs, indicating the presence of a skip character, such that the resulting count for that time period is considered invalid, and discarded. As noted above, it is possible to have a rising strobe edge followed by a falling data edge. This may occur, for example, when a skip character 845 is inserted into the data sequence.

This second auto-negotiating scheme, using inserted skip characters, can be further optimized. Training sequences stressing forward long jumps (e.g., EF/F0/F1 . . . FF)h-00h may be complemented by sequences stressing reverse long jumps (e.g., FFh-(10 / 0F / 0E . . . 01/ 00)h. Using forward and reverse long jump training sequences deliver a set of upper and lower bounds respectively. After such sequences have been tested, only jumps from one of the upper-bounds to one of the lower bounds would be classified a long jump which constitutes a failure point necessitating the insertion of a skip character. The result is that fewer skip characters are inserted, and data throughput increases. In contrast with the first auto-negotiation scheme, all $2^n$ code words are valid, and no special coding/decoding is required. The drawback to this scheme is the latency penalty exacted when the desired data sequence contains many long jumps. To reduce the significance of the penalty, a statistical study of the data traffic may be made, and coding techniques that minimize long jumps can be implemented.

In either case, auto-negotiating logic provides a mechanism for adapting to a variety of interconnect media, and offers the best possible bandwidth without user intervention; i.e., it is user friendly. Merely investing in better quality cable, for example, may provide an automatic performance increase.

It should be noted that the apparatus 264, 464, 511; data transmitters 266, 366, 466; converter modules 268, 368; signaling nodes 270, 470; data receivers 374, 674; measurement module 376; counters 478, 480, 681, 683; multiplexer 488; and edge detectors 685, 785 may all be characterized as "modules" herein. Such modules may include hardware circuitry, such as a microprocessor and/or memory circuits, software program modules, and/or firmware, and combinations thereof, as directed by the architect of the apparatus 264, 464, 611 and system 372, and appropriate for particular implementations of various embodiments of the invention.

One of ordinary skill in the art will understand that the apparatus and system of various embodiments of the present invention can be used in applications other than those involving transmitters and receivers, and thus, the invention is not to be so limited. The illustrations of an apparatus 264, 464, 611 and a system 372 are intended to provide a general understanding of the structure of various embodiments of the present invention, and are not intended to serve as a complete description of all the elements and features of apparatus and systems which might make use of the structures described herein.

Applications which may include the novel apparatus and system of various embodiments of the present invention include electronic circuitry used in high-speed computers, communications and signal processing circuitry, processor modules, embedded processors, and application-specific modules, including multilayer, multi-chip modules. Such apparatus and systems may further be included as sub-components within a variety of electronic systems, such as televisions, video cameras, cellular telephones, personal computers, radios, vehicles, and others.

Figure 9:
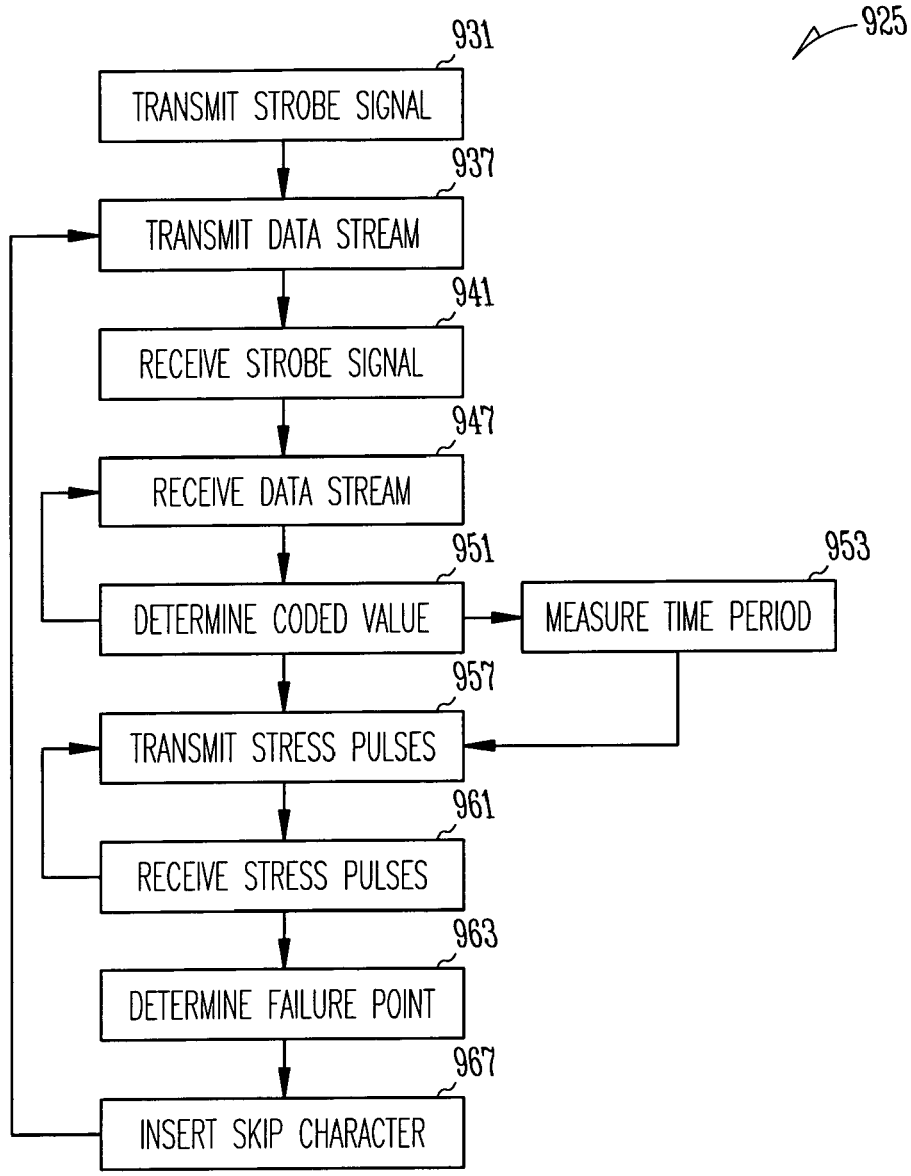
FIG. 9 illustrates a communication method according to an embodiment of the present invention.

FIG. 9 illustrates a communication method according to an embodiment of the present invention. The method 925 may include transmitting a strobe signal having a first strobe edge at block 931, and transmitting a first data stream having a first edge displaced by a first time period from the first strobe edge, such that the first time period represents a first coded value at block 937. The method 925 may also include receiving the strobe signal and the data stream at blocks 941 and 947, respectively. This activity may be followed by determining the magnitude of the first coded value as represented by an n-bit number at block 951, which may in turn include measuring the first time period at block 953. As noted previously, the first strobe edge may be a rising edge, and the first edge of the data stream may also be a rising edge. Transmitting the data stream at block 937 may also include transmitting the first data stream including a second edge (e.g. a falling edge) displaced by a second time period from a second strobe edge, wherein the second time period represents a second coded value.

The method 925 may also include transmitting a series of increasingly stressful pulses carried by the data stream at block 957, followed by receiving the series of increasingly stressful pulses at block 961, and determining a failure point including a selected one of the series of increasingly stressful pulses at block 963. The method may conclude with inserting a skip character into the data stream in place of the failure point at block 967, or continue with repeated transmission of various selected code word values in the data stream at block 937 (in combination with continued transmission of the strobe signal).

It should be noted that while counters have been used as an example of code determination elements herein, other mechanisms may also be used according to various embodiments of the invention, and therefore, the invention is not to be so limited. Therefore, it should be clear that some embodiments of the present invention may also be described in the context of computer-executable instructions, such as program modules, being executed by a computer. Generally, program modules may include routines, programs, objects, components, data structures, etc. that perform particular tasks or implement particular abstract data types.

Thus, referring back to FIG. 1, an article 158 according to an embodiment of the invention can be seen. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientated format using an object-oriented language such as Java, Smalltalk, or C++. Alternatively, the programs can be structured in a procedure-orientated format using a procedural language, such as COBOL or C. The software components may communicate using any of a number of mechanisms that are well-known to those skilled in the art, such as Application Program Interfaces (APIs) or interprocess communication techniques such as the Remote Procedure Call (RPC). However, as will be appreciated by one of ordinary skill in the art upon reading this disclosure, the teachings of various embodiments of the present invention are not limited to any particular programming language or environment.

As is evident from the preceding description, the processor 162 typically accesses at least some form of computer-readable media, such as the memory 159. However, computer-readable and/or accessible media may be any available media that can be accessed by the apparatus 264, 464, 611 and system 372. By way of example and not limitation, computer-readable media may comprise computer storage media and communications media. Computer storage media includes volatile and non-volatile, removable and non-removable media implemented using any method or technology for storage of information such as computer-readable instructions, data structures, program modules or other data. Communication media specifically embodies computer-readable instructions, data structures, program modules or other data present in a modulated data signal such as a carrier wave, coded information signal, and/or other transport mechanism, which includes any information delivery media. The term "modulated data signal" means a signal that has one or more of its characteristics set or changed in such a manner as to encode information in the signal. By way of example and not limitation, communications media also include wired media such as a wired network or direct-wired connections, and wireless media such as acoustic, optical, radio frequency, infrared and other wireless media. Combinations of any of the above are also to be included within the scope of computer-readable and/or accessible media.

Thus, referring to FIG. 1, it is now easily understood that another embodiment of the invention may include an article 158 comprising a machine-accessible medium 158 having associated data 160, wherein the data 160, when accessed, results in a machine 162 performing activities such as receiving a strobe signal having a first strobe edge, and receiving a first data stream having a first edge displaced by a first time period from the first strobe edge, such that the first time period represents a first coded value. Other activities performed by the machine as a result of accessing the data 160 may include transmitting a series of increasingly stressful pulses carried by the first data stream, receiving the series of increasingly stressful pulses, determining a failure point including a selected one of the series of increasingly stressful pulses, and inserting a skip character into the first data stream in place of the failure point. Those skilled in the art will realize many other activities which may be performed by the machine which come within the scope of various embodiments of the invention.

Those skilled in the art will also realize, by referring to the preceding discussion and FIG. 1, that when the invention is embodied in the form of a coded information signal, embodied in a carrier wave 112, the coded information signal may represent data including a first edge displaced by a first time period from a rising edge of a strobe signal and corresponding to a first coded value, and a second edge displaced by a second time period from the falling edge of the strobe signal and corresponding to a second coded value. The preceding discussion will also lead one skilled in the art to realize that the first time period may correspond to a selected one of $2^n$ time period displacements, and that the first and second edges will typically be separated by a time period greater than that of a predetermined failure point. Implementations of various embodiments of the invention should thus take into consideration the criticality of time period accuracy in the determination of data code words. Hardware and medium-induced signal rise and fall times may be very important to resolving data code word values correctly. Other considerations may include using matched media to carry strobe and data information signals, and using drivers and receivers with comparable signal rise-fall timing, as well as time and frequency domain response.

Thus, various embodiments of the invention may provide a mechanism for communicating data which exceeds the base clocking rate (i.e. strobe signal frequency), providing n-bits of data on a single wire, for example. Further, improvements in communication speed may be achieved at low cost, by improving interconnects and/or conducting media as circumstances permit. The combination of these features may render a communications apparatus and system that provides increased data transmission speed at higher efficiency and reduced cost, using bandwidth negotiation to enhance basic logic circuitry performance.

Although specific embodiments have been illustrated and described herein, those of ordinary skill in the art will appreciate that any arrangement which is calculated to achieve the same purpose may be substituted for the specific embodiments shown. This disclosure is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of embodiments of the invention includes any other applications in which the above structures and methods are used. The scope of embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to interpret or limit the scope or meaning of the claims. In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. An apparatus, comprising:
   a data transmitter to send a strobe signal having a strobe edge and a data stream having a first data edge displaced by a first time period from the strobe edge, wherein the first time period corresponds to a first coded value; and
   a signaling node capable of being communicatively coupled to the data transmitter.

2. The apparatus of claim 1, further comprising:
   a medium to carry the strobe signal and the data stream, the medium capable of being communicatively coupled to the signaling node.

3. The apparatus of claim 1, wherein the data transmitter includes a conversion module to convert the first coded value into the first time period, the first time period being a selected one of $2^n$ time periods and representing an n-bit coded value.

4. The apparatus of claim 1, wherein the strobe edge is a rising edge, wherein the data stream includes a second data edge displaced by a second time period from a falling edge of the strobe signal, and wherein the second time period corresponds to a second coded value.

5. The apparatus of claim 4, wherein the data transmitter includes a first non-underflow, count-to-zero down-counter to load the first coded value.

6. The apparatus of claim 5, wherein the data transmitter includes a second non-underflow, count-to-zero down-counter to load the second coded value.

7. A system, comprising:
   a data transmitter to send a strobe signal having a strobe edge and a data stream having a data edge displaced by a time period from the strobe edge, wherein the time period corresponds to a coded value; and
   a data receiver capable of being communicatively coupled to the data transmitter.

8. The system of claim 7, wherein the data receiver includes a measurement module to measure a time period between the strobe and data edges and converts the time period into the coded value, which is an n-bit coded value.

9. The system of claim 7, further comprising:
   a medium capable of coupling the data transmitter to the data receiver, the medium capable of carrying the strobe signal and the data stream.

10. The system of claim 7, wherein the strobe edge is a rising edge, and wherein the data receiver includes a first count-up counter that starts counting from a value of approximately zero when the rising edge is detected and stops counting at approximately the coded value when the data edge is detected.

11. The system of claim 10, wherein the data receiver includes a second count-up counter that starts counting from a value of approximately zero when a falling edge of the strobe signal is detected and stops counting at approximately a second coded value when the data edge of the data stream is detected.

12. The system of claim 11, further comprising:
    an edge detector coupled to the first count-up counter.

13. A method, comprising:
    transmitting a strobe signal having a first strobe edge; and
    transmitting a data stream having a first edge displaced by a first time period from the first strobe edge, wherein the first time period represents a first coded value.

14. The method of claim 13, further comprising:
    receiving the strobe signal and the data stream; and
    determining a magnitude of the first coded value as represented by an n-bit number.

15. The method of claim 14, wherein determining a magnitude of the coded value as represented by an n-bit number further comprises:
    measuring the first time period.

16. The method of claim 13, wherein the strobe signal includes a second strobe edge, and wherein transmitting the data stream further comprises:
    transmitting the data stream including a second edge displaced by a second time period from the second strobe edge, wherein the second time period represents a second coded value.

17. An article comprising a machine-accessible medium having associated data, wherein the data, when accessed, results in a machine performing:
    receiving a strobe signal having a first strobe edge; and
    receiving a data stream having a first edge displaced by a first time period from the first strobe edge, wherein the first time period represents a first coded value.

18. The article of claim 17, wherein the machine-accessible medium further includes data, which when accessed by the machine, results in the machine performing:
    transmitting a series of increasingly stressful pulses carried by the data stream.

19. The article of claim 18, wherein the machine-accessible medium further includes data, which when accessed by the machine, results in the machine performing:
    receiving the series of increasingly stressful pulses; and
    determining a failure point including a selected one of the series of increasingly stressful pulses.

20. The article of claim 19, wherein the machine-accessible medium further includes data, which when accessed by the machine, results in the machine performing:
    inserting a skip character into the data stream in place of the failure point.

21. A coded information signal embodied in a carrier wave, the coded information signal representing data, comprising:
    a first edge displaced by a first time period from a rising edge of a strobe signal and corresponding to a first coded value; and
    a second edge displaced by a second time period from a falling edge of the strobe signal and corresponding to a second coded value.

22. The coded information signal of claim 21, wherein the first time period corresponds to a selected one of $2^n$ time period displacements.

23. The coded information signal of claim 21, wherein the first and second edges are separated by a time period greater than a predetermined failure point.

* * * * *